May 25, 1965 C. W. LEMMERMAN 3,185,252
JET ENGINE NOISE ATTENUATOR

Filed July 29, 1957 3 Sheets-Sheet 1

INVENTOR.
CARL W. LEMMERMAN
BY
*Lindsey and Prutzman*
ATTORNEYS

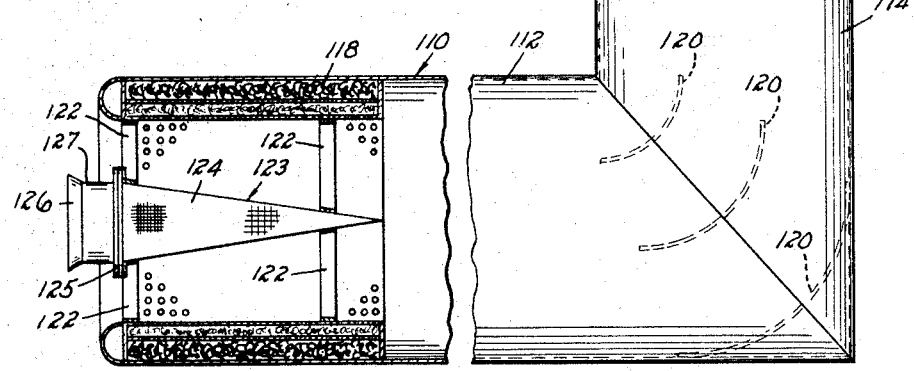
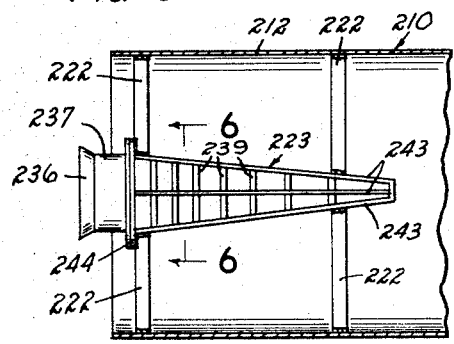
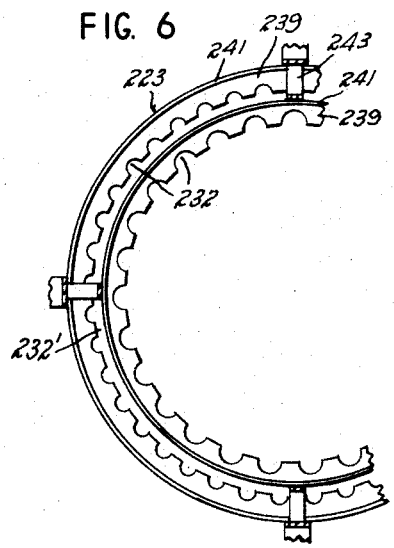
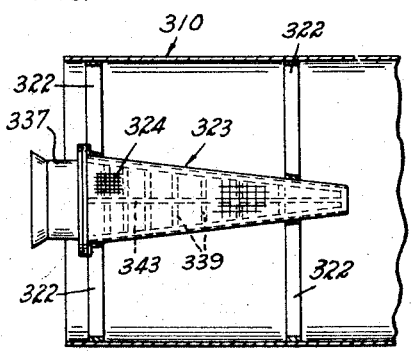

May 25, 1965 C. W. LEMMERMAN 3,185,252
JET ENGINE NOISE ATTENUATOR
Filed July 29, 1957 3 Sheets-Sheet 3

INVENTOR.
CARL W. LEMMERMAN
BY
Lindsey and Prutzman
ATTORNEYS 3,185,252
JET ENGINE NOISE ATTENUATOR
Carl W. Lemmerman, West Hartford, Conn. (% C. W. Lemmerman, Inc., 111 Lafayette St., Hartford, Conn.)
Filed July 29, 1957, Ser. No. 674,976
6 Claims. (Cl. 181—51)

This invention relates generally to sound attenuators and more particularly, to a novel and improved attenuator for ground use in reducing the noise level of exhaust noises of a jet engine.

The advent of jet engine aircraft has raised a serious problem of noise abatement particularly in the instance of testing facilities located in or near densely populated areas. It is therefore an object of this invention to provide a noise attenuator of novel and improved construction particularly adapted for use in connection with the ground testing of jet engines which will provide an adequate reduction in noise level, especially in the lower frequency noise range, so as to render the noise attendant to such testing unobjectionable.

It is another object of this invention to provide a jet engine noise attenuator of the type described which is relatively simple to fabricate and assemble and which is compact and of relatively light weight in order to render it suitable for use as a portable structure thus obviating the necessity of moving large aircraft to a specific test location.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 4 is a fragmentary elevational view, partly in section, of another embodiment of the invention;

FIG. 5 is a fragmentary longitudinal cross sectional view of another embodiment of the invention;

FIG. 6 is an enlarged fragmentary cross sectional view along the line 6—6 of FIG. 5;

FIG. 7 is a fragmentary longitudinal cross sectional view of another embodiment of the invention;

Figure 1:
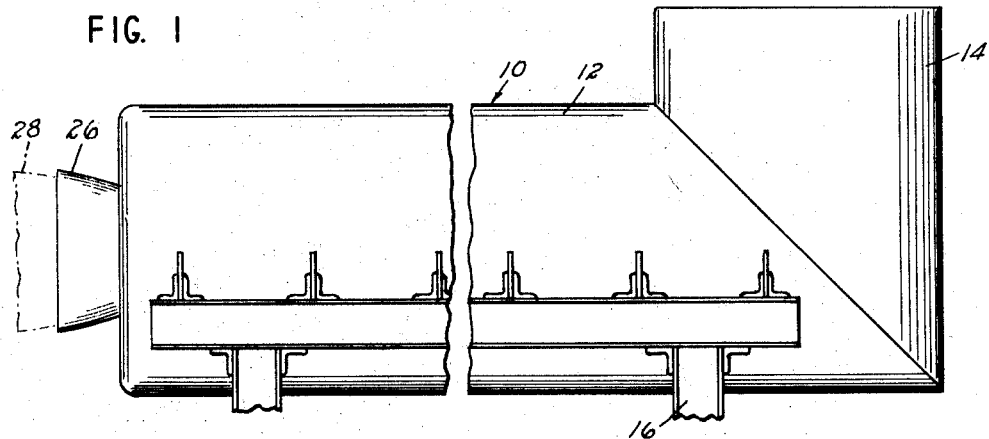
FIG. 1 is a fragmentary side elevational view of a jet engine noise attenuator constructed in accordance with the invention.
Figure 2:
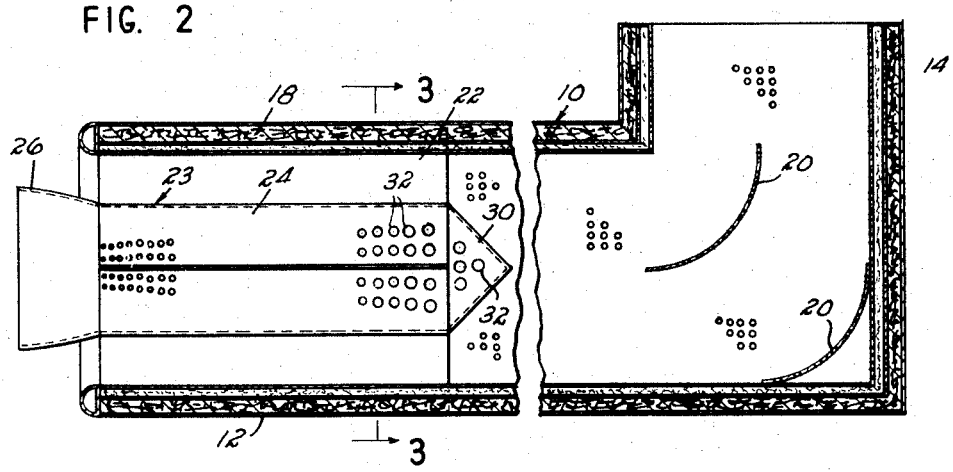
FIG. 2 is a fragmentary longitudinal cross sectional view of the attenuator of FIG. 1.
Figure 3:
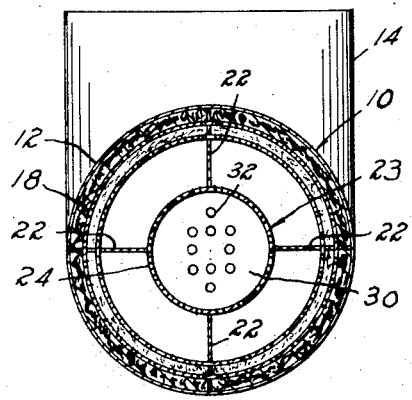
FIG. 3 is a cross sectional view along the line 3—3 of FIG. 2.

With reference to the embodiment shown in FIGS. 1–3, a jet engine noise attenuator constructed in accordance with the invention comprises a cylindrical sheet metal outer shell or housing 10 including a horizontal portion 12 and a vertical portion or stack 14 at one end thereof. A frame 16 may be provided for the support of the shell 10 on a carriage (not shown) for ease of portability. The outer shell 10, may, if desired, be provided with sound absorbent lining 18 for the attenuation of relatively high frequency sounds passing through the shell. The sound absorbent lining should be of a type which will withstand the effects of the high temperature and high velocity exhaust gases, and in the specific embodiment, is shown merely by way of example and not by way of limitation as constructed in accordance with my prior Patent No. 2,674,336. A plurality of arcuate perforated metal turning vanes 20 are disposed within the shell 10 at the juncture of the horizontal portion 12 and vertical portion 14.

In accordance with the invention, supported coaxially in radially spaced relation within the outer shell 10 by webs 22 is a hollow gas flow diffusing and noise frequency determining member 23 comprising a perforated sheet metal cylinder 24 of substantially lesser length and diameter than the shell 10. One end of the cylinder 24 is disposed closely adjacent the inlet end of the shell 10 and is provided with an imperforate outwardly flared portion 26 forming an inlet for the reception of a jet engine tailpipe 28. A conical perforated sheet metal gas diffusing member 30 is mounted on the inner end of the cylinder 24. The openings or perforations 32 in the cylinder 24 and diffusing member 30 are preferably of relatively small diameter adjacent the inlet of the cylinder and of progressively increasing diameter and spacing toward the tip of the diffusing member.

In the use of the attenuator constructed as described, the end of an engine tailpipe is positioned in the inlet 26 of the cylinder 24 so that the exhaust gases of the jet engine will be directed into the cylinder 24 and will pass through the perforations or openings 32 in the cylinder 24 and diffusing member 30. It is preferred that the total area of the openings 32 be at least equal to the cross sectional diameter of the tailpipe so as to prevent any back pressure in the tailpipe. The exhaust gases will pass through the outer shell 10 and will be exhausted through the upper end of the vertically extending portion 14 thereof. As the exhaust gases pass through the shell 10, secondary air will be drawn in the inlet of the shell between the shell and the cylinder 24 to provide cooling of the exhaust gases and attendant reduction in the noise level thereof. Some turbulence will occur where the exhaust gases passing through the openings in the cylinder 24 meet the secondary air flow, particularly in the area adjacent the inlet end of the cylinder 24. The relatively small size of the apertures nearer the inlet of the cylinder 24 result in a minimizing of the turbulence and effectively prevent recirculation of gases into the tube. A specific example of an attenuator of the type just described comprises an outer shell 10 approximately 14 feet in length and 4.5 feet in diameter with a cylinder 24 of approximately 8 feet in length and 2 feet in diameter having openings 32 ranging in size and spacing from approximately 3/32 of an inch on 3/16 inch centers to approximately 2 inches on 4 inch centers.

Figure 10:
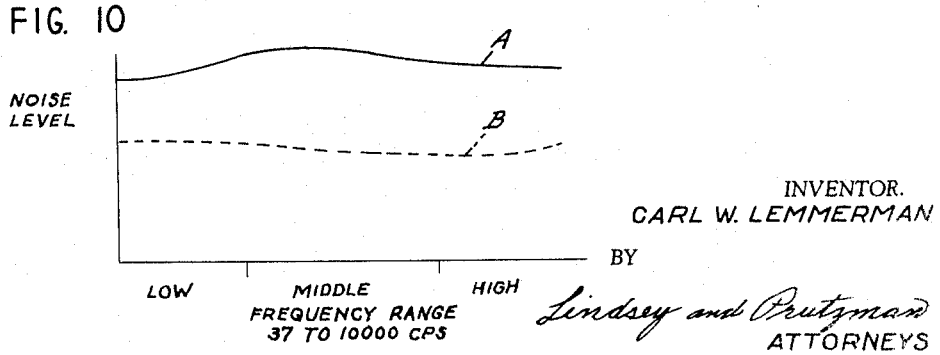
FIG. 10 is a graph illustrating the noise level reducing characteristics of an attenuator constructed in accordance with the invention.

In FIG. 10, there is shown in graph form the performance characteristics which may be expected of a jet engine noise attenuator constructed in accordance with the invention with respect to noise reduction of frequencies ranging from a low of 37 cycles per second to a high of approximately 10,000 cycles per second. The solid line A represents the exhaust noise level of an exemplary engine without any attenuation, and the dotted line B represents the engine exhaust noise level which may be expected as a result of the use of an attenuator of the type shown in FIGS. 1–3. There can be seen that a marked decrease in noise level can be expected in the low and middle frequency ranges as well as in the high frequency range, indicating the effectiveness of the attenuator in reducing low frequency noises without the use of resonating chambers or other large and bulky devices usually necessary for low frequency noise attenuation.

It is believed that the acoustical theory of operation of an attenuator constructed in accordance with the invention can best be explained by reference to FIG. 9 wherein is diagrammatically shown the pattern of the flow of exhaust gases from the tailpipe 50 of a jet engine. In the absence of any flow restricting structures, the gases flow from the tailpipe in a cone 51 having its projected apex disposed inside the tailpipe. The exhaust cone 51 has a conical core 52 extending from the end of the tailpipe and converging in an opposite direction from that of the cone 51. The core 52 is comprised of gases of substantially constant velocity approximately equal to the tailpipe exit velocity of the jet exhaust, and extends to a point spaced aft of the tailpipe a distance approximately equal to 4.5 times the tailpipe diameter. The frequencies of jet exhaust noise in the cone 51 immediately adjacent the end of the tailpipe are relatively high. However, the frequencies of noise of the exhaust gases begin to decrease very sharply a short distance from the tailpipe, largely due to a particularly turbulent area about the core 52 which begins at a point aft of the tailpipe located a distance approximately equal to three quarters of the tailpipe diameter and which extends to the tip of the core. It is the low frequency noises attendant to this turbulent area about the core as well as those resulting from the passage of the exhaust gases through the relatively large tailpipe which are objectionable and the level of which it is desirable to reduce.

Figure 9:
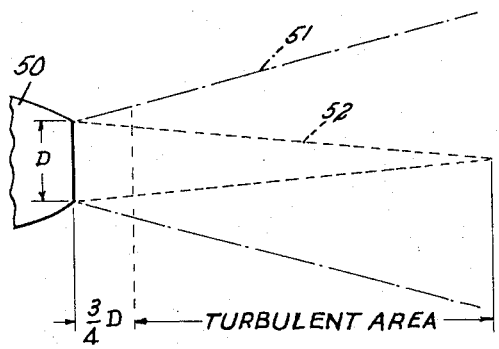
FIG. 9 is a diagrammatic view of an exemplary flow pattern of exhaust gases from the tailpipe of a jet engine.

The introduction of the exhaust gases into the cylinder 24 will, it has been found, prevent the formation of the cone 51 as shown in FIG. 9 where no confining structure is present. Further, the impeding of the diverging flow of exhaust gases results in a substantial shortening of the length of the core 52. The combined length of the cylinder 24 and diffusing member 30 is preferably at least equal to the length of the shortened core which, for example, may be approximately two and one half times the tailpipe diameter. The exhaust gases in and immediately about the core will be diffused through the openings in the cylinder 24 and diffusing cone 30 and into the outer shell, thus very substantially reducing the turbulence and attendant low frequency noises normally associated with the region about the core. The size of the openings in the cylinder are selected to provide the desired diffusing performance while at the same time to assure that the noises attendant to the passage of high velocity gases therethrough will be in the middle and high frequency ranges, which noises may be effectively attenuated by sound absorbent lining in the outer shell or may be beamed in an upward direction by the vanes so as not to be objectionable.

With reference to FIG. 4, the embodiment of the invention shown therein comprises a cylindrical metal outer shell or housing 110 having a horizontal portion 112 and a vertical end portion 114. A plurality of perforated arcuate metal vanes 120 are disposed internally of the shell at the juncture of the horizontal portion 112 and vertical portion 114. Disposed coaxially within the outer shell at the inlet end thereof is a hollow gas flow diffusing and noise frequency determining member 123 comprising a wire mesh cone 124 supported in radially spaced relation within the shell by means of webs 122. The cone 124 is of substantially lesser length and diameter than the shell 110. The cone 124 is provided at its inlet end with a flange 125 on which is mounted in coaxial relation thereto an imperforate metal inlet cylinder 127 having a flared inlet end 126 adapted to receive a jet engine tailpipe. The outer shell in this embodiment is provided with sound absorbent lining 118 disposed only in the area of the cone 124, although if desired, the shell may be lined over its entire length as is the shell 10 of FIG. 1 or the lining may be entirely omitted as in the shells 210 and 310 of FIGS. 5 and 7, respectively.

In the operation of the attenuator of FIG. 4, the end of tailpipe of the jet engine is placed in the inlet 126 so that the exhaust gases will flow through the cone 124. The openings formed by the wire mesh of the cone 124 preferably increase in size from the inlet end of the cone toward the tip thereof in the same manner and for the same purpose as the openings 32 of the cylinder 24 of the embodiment of FIG. 2, and the cone 124 serves the same acoustical and gas diffusing function as described above in connection with the cylinder 24 of FIG. 2.

With reference to the embodiment of FIG. 5, the attenuator shown therein also comprises a cylindrical outer shell 210 comprising a horizontal portion 212. The shell may be provided with a vertical portion at the end of the horizontal portion such as is shown in connection with the shells 10 and 110 of FIGS. 1 and 4 respectively. As in the embodiments of FIGS. 1 and 4, a hollow gas diffusing and noise frequency determining member 223 is disposed within the shell 210 adjacent its inlet end. In this embodiment, the diffusing and frequency determining member comprises a plurality of annular rings 239 of different diameter, each having a flange 241 around the outer periphery thereof. The rings are supported in axially spaced coaxial relation by ribs 243 mounted on the flanges 241 so as to form a cone-like structure. The length and diameter of the cone 223 is substantially less than that of the shell 210. The ribs 243 are secured to an annular ring 244 at the inlet end of the cone and the ring 244 is supported coaxially within the shell 210 in radially spaced relation thereto by the webs 222. A plurality of additional webs 222 support the tip end of the cone 223 on the shell 210.

In accordance with the invention, the rings 239 are each provided with a plurality of notches or openings 232 around the inner edge thereof as shown in FIG. 6. Additionally, the inner edge of each ring 239 is spaced radially outwardly of the periphery of the next adjacent smaller ring to provide a series of concentric annular openings 232'. An inlet tube 237 is mounted on the ring 244 and is flared at its inlet end 236 for the reception of a jet engine tailpipe.

In the use of the attenuator of FIG. 5, engine exhaust gases are admitted into the inlet tube 236 and are exhausted through the relatively small annular openings 232' formed by the radial spacing of the rings, as well as through the openings or notches 232 in the rings. The diffusion of the gases through these openings results in a reduction in turbulance within the surrounding space in the outer shell 210 with the attendant reduction in low frequency noises. Further, as in the case of the embodiment of FIGS. 2 and 4, the size of openings in the diffusing and frequency determining member is selected to provide a relatively high frequency noise range attendant to the passage of gases therethrough. In order to prevent recirculation of secondary air and exhaust gases into the cone at the inlet end, it is preferred that the rings 239 be spaced axially of each other a lesser distance at the inlet end of the cone than at the outlet end and that the notches in the rings closer to the inlet end of the cone be smaller than the notches in the rings at the outlet end.

The embodiment of the invention shown in FIG. 7 is generally similar to the embodiment of FIG. 5 in that it comprises an outer cylindrical metal shell 310 in which is disposed in coaxially radially spaced relation a hollow gas flow diffusing and noise frequency determining member 323 comprising a plurality of axially and radially spaced apart coaxially arranged rings 339 similar to the rings 239 of FIG. 5 and forming a cone-like structure. The cone is provided with an inlet tube 337 and is supported on the shell 310 by webs 322. The axial and radial spacing of the rings 339 is similar to that of the rings 239 of FIG. 5, for the same purpose, and the rings 339 are preferably provided with notches along the inner edge thereof similar in size and arrangement as the notches 232 of the rings 239. In the embodiment of FIG. 7, the rings 339 are covered with a wire mesh cone 324 of a size and shape conforming to the cone formed by the rings and provided with openings increasing in size from the inlet end of the cone toward the tip thereof, similar to the wire mesh cone 124 of FIG. 4. The wire mesh covering of the rings provides additional diffusion of the exhaust gases with the attendant improvement in low frequency attenuation.

Figure 8:
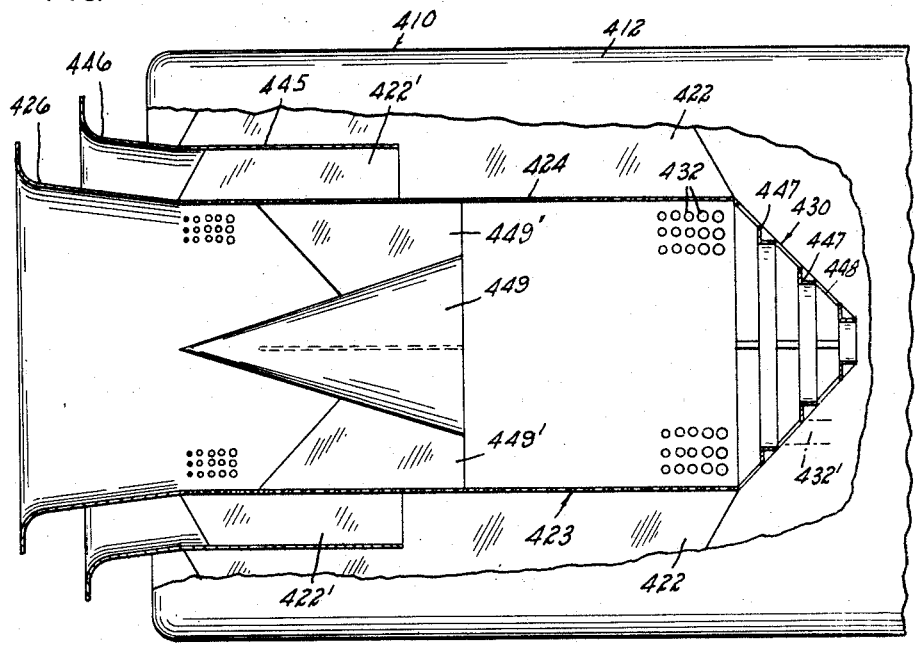
FIG. 8 is a fragmentary elevational view, partially cut away and partly in cross section, illustrating another embodiment of the invention.

The embodiment of FIG. 8 comprises an outer shell or housing 410 having a horizontal portion 412 and may be provided with a vertical portion at the outlet end thereof as in the embodiments of FIGS. 1 and 4. A hollow gas flow and noise frequency determining member 423 comprising a perforated metal cylinder 424 is disposed coaxially in spaced relation within the shell 410 and is provided with an outwardly flared imperforate inlet end 426 disposed adjacent one end of the shell 410 for the reception of a jet engine tailpipe. The diameter of the cylinder 424 is substantially less than that of the shell 410. A cone-like gas diffusing member 430 is mounted on the outlet end of the cylinder 424 in coaxial relation thereto and comprises a series of concentrically disposed annular rings 447 of progressively decreasing diameters supported in axially spaced relation by a plurality of ribs 448 mounted on the cylinder 424. The length of the cylinder 424 and cone 430 is substantially less than that of the shell 410. The radial spacing of the inner edge of each ring from the outer edge of the next adjacent smaller rings as indicated in FIG. 8 provides a series of annular openings 432' facing axially of the cylinder 424.

A conical diffuser 449 comprising an imperforate sheet metal cone is mounted coaxially within the tube 424 by webs 449' with its apex extending toward the inlet 426 of the tube. The base of the cone 449 has a diameter substantially less than the inner diameter of the cylinder 424. The diffuser cone is preferably located axially of the cylinder 424 such that its tip will normally be spaced from the end of an engine tailpipe a distance approximately equal to three quarters of the tailpipe diameter. The base diameter of the cone 449 should be selected so that the annular clearance area between the base of the cone and the cylinder 424 is at least equal to the cross sectional area of the tailpipe in order to prevent back pressure. An imperforate sheet metal cylinder 445 having an outwardly flared inlet end 446 is disposed coaxially of the cylinder 424 in radially spaced relation between the cylinder 424 and outer shell 410 with one end of the cylinder 445 disposed closely adjacent the inlet 426 of the cylinder 424, the other end of the cylinder 445 preferably terminating approximately at the longitudinal midpoint of the cylinder 424. The imperforate cylinder is supported on the perforate cylinder 424 by a plurality of webs 422' extending radially therebetween. The cylinder 424 is supported on the shell 410 by a plurality of webs 422 extending radially therebetween and longitudinally thereof.

In the use of the attenuator of FIG. 8, the tailpipe of a jet engine is inserted coaxially within the inlet of the cylinder 424 and located from the apex of the diffusing cone 449 a distance approximately three quarters the diameter of the tailpipe. The gases exhausted from the jet engine will be diffused by the cone 449 and will pass through the openings 432 in the cylinder 424 as well as through the annular openings 432' formed by the diffusing rings 447. The use of the cone 449, of course, increases the diffusion characteristics of this attenuator by breaking up the core of the exhaust gases. The size of the openings 432 in the cylinder 424 are, of course, selected as in the previously described embodiments, to assure a relatively high frequency noise range as a result of high velocity gas flow through the openings.

During the use of the attenuator, secondary air will be drawn in between the imperforate cylinder 445 and perforate cylinder 424 and also between the cylinder 445 and outer shell 410. The provision of the cylinder 445 reduces the volume of the secondary air passing by the cylinder 424 adjacent its inlet end and provides a reduction in the turbulence in this area resulting from the engagement of high pressure exhaust gases with the secondary air and thus a reduction in attendant low frequency noises as well as any tendency for the gases to recirculate into the cylinder 424.

There has thus been provided a noise attenuator of novel and improved construction, particularly adapted for use with jet engine aircraft to reduce the noise level thereof during ground run-up testing of the engine. The attenuator effectively reduces the level of the low frequency exhaust noises without the use of large and weighty structures normally associated with low frequency noise attenuation. The relative light weight of the attenuator makes it practical to move the attenuator from one location to another. An attenuator constructed in accordance with the invention is not, however, limited to use as a portable attenuator inasmuch as attenuators constructed in accordance with the invention would be equally suitable for use in conjunction with fixed test cells and the like.

I claim:

1. A jet engine exhaust noise attenuator comprising an outer housing having an inlet opening at one end thereof and an outlet opening spaced from said inlet opening, an inner cylindrical sheet metal member disposed coaxially in radially spaced relation within said housing with one end thereof disposed adjacent said inlet opening of said housing, a metal gas diffusing member mounted on the other end of said inner member and having a plurality of openings, said inner member being provided with perforations for the diffusion of gases received therein with said perforations being dimensioned to provide a predetermined range of noise frequencies in response to passage of gases therethrough, and an imperforate sheet metal cone having a base diameter substantially less than the diameter of said inner member, means mounting said cone in coaxial alignment within said inner member intermediate the ends thereof with the tip of said cone extending toward but terminating short of said one end of the inner member, said outer housing and said inner cylindrical sheet metal member cooperating to define an annular air inlet passageway communicating with said inlet opening.

2. A jet engine exhaust noise attenuator comprising an outer housing having an inlet opening at one end thereof and an outlet opening spaced from said inlet opening, an inner cylindrical sheet metal member disposed coaxially in radially spaced relation within said housing with one end thereof adjacent said inlet opening of said housing, a metal gas diffusing member mounted on the other end of said inner member and provided with a plurality of openings, said inner member being provided with perforations for the diffusion of gases received therein with said perforations being dimensioned to provide a predetermined range of noise frequencies in response to passage of gases therethrough, said perforations being relatively small adjacent said one end of the inner member and increasing in size toward the other end thereof, and an imperforate sheet metal cone having a base diameter substantially less than the diameter of said inner member, means mounting said cone in coaxial alignment within and intermediate the ends of said inner member with the top of said cone extending toward but terminating short of said one end of the inner member, and an imperforate sheet metal cylinder of substantially lesser diameter than said outer housing and of substantially greater diameter but lesser length than said inner member disposed in coaxial alignment between said inner member and housing and having with one end thereof disposed adjacent said one end of the inner member, said outer housing and said inner sheet metal member cooperating to define an annular air inlet passageway communicating with said inlet opening, said annular inlet passageway being longitudinally divided by said imperforate sheet metal cylinder.

3. A jet engine exhaust noise attenuator comprising an outer cylindrical housing having an inlet opening at one end thereof and an outlet opening spaced from said inlet opening, an inner cylindrical sheet metal member disposed coaxially in radially spaced relation within said housing with one end thereof disposed adjacent said inlet opening of said housing, said inner member being provided with perforations for the diffusion of gases received therein, an imperforate sheet metal cone having a base diameter substantially less than the diameter of said inner member, means mounting said cone in coaxial alignment within said inner member with the tip of said cone extending toward but terminating short of said one end of the inner member, and a conical gas diffusing member on the other end of said inner member comprising a plurality of coaxially aligned axially spaced apart annular metal rings, said outer housing and said inner member cooperating to define an annular air inlet passageway communicating with said inlet opening.

4. A jet engine exhaust noise attenuator comprising an outer cylindrical sheet metal shell having an inlet opening at one end thereof and an outlet opening spaced from said inlet opening, an inner cylindrical sheet metal cylinder disposed coaxially in radially spaced relation within said housing with one end thereof disposed adjacent said inlet opening of said housing, said cylinder being provided with perforations for the diffusion of gases received therein with said perforations being relatively small and closely spaced adjacent said one end of said inner member and increasing in size and spacing toward the other end of said cylinder, an imperforate sheet metal cone having a base diameter substantially less than the diameter of said cylinder disposed in coaxial alignment within said cylinder with the tip thereof extending toward but terminating short of said one end of the cylinder, and a conical gas diffusing member mounted on the other end of said cylinder comprising a plurality of coaxially aligned axially spaced apart annular metal rings with the inner edge of each ring spaced radially outwardly of the periphery of the next adjacent smaller ring, said outer shell and said inner cylinder cooperating to define an annular air inlet passageway communicating with said inlet opening.

5. A jet engine exhaust noise attenuator comprising an outer cylindrical sheet metal shell having an inlet opening at one end thereof and an outlet opening spaced from said inlet opening, a perforated sheet metal cylinder of substantially lesser diameter and length than said outer shell supported on said shell in coaxially aligned radially inwardly spaced relation with said inlet end of the cylinder disposed adjacent one end of the shell, the perforations in said cylinder being relatively small and closely spaced adjacent said one end of said cylinder and being progressively larger in size and spacing toward the other end thereof, an imperforate sheet metal cylinder of substantially lesser length than said perforated cylinder coaxially supported in said outer shell in radially spaced relation between said outer shell and perforated cylinder, one end of said imperforate cylinder being disposed adjacent said one end of said perforated cylinder, an imperforate sheet metal cone having a base diameter substantially less than the diameter of said perforated cylinder supported coaxially within said perforated cylinder with the apex thereof extending toward but terminating short of said one end of the perforated cylinder, and a conical gas diffusing member mounted coaxially on the other end of said perforated cylinder comprising a plurality of coaxially aligned annular metal rings spaced axially and radially of each other to provide a series of concentric annular openings, said outer shell and said inner sheet metal cylinder cooperating to define an annular air inlet passageway communicating with said inlet opening.

6. A sound attenuator for high temperature, high velocity exhaust gases from jet engines or the like comprising an outer housing having an inlet opening at one end thereof and an outer opening spaced from said inlet opening, an inner cylindrical sheet metal member disposed coaxially in radially spaced relation within said housing with one end thereof disposed adjacent said inlet opening of said housing and adapted to be coaxially aligned with the tailpipe of a jet engine, said inner member being provided with perforations for the diffusion of gases received therein with said perforations being dimensioned to provide a predetermined range of noise frequencies in response to passage of gases therethrough, the perforations in inner member having edge walls, an imperforate sheet metal cylinder disposed in radially spaced coaxially aligned relation between said inner member and housing with one end thereof disposed adjacent said one end of the inner member, said cylinder terminating at its other end intermediate the ends of the inner member, and a conical gas diffusing member on the other end of said inner member comprising a plurality of coaxially aligned axially spaced apart annular metal rings, said outer housing and said inner cylindrical sheet metal member cooperating to define an annular air inlet passageway communicating with said inlet opening.

References Cited by the Examiner
UNITED STATES PATENTS

| 821,828 | 5/06 | Phelps | 181—59 |
| 1,532,928 | 4/25 | O'Connor | 181—49 |
| 1,651,145 | 11/27 | Mola | 181—51 |
| 1,685,701 | 9/28 | Blanchard | 181—70 X |
| 1,794,276 | 2/31 | Bowes | 181—51 |
| 1,833,256 | 11/31 | Miner | 181—51 |
| 2,008,964 | 7/35 | Mikulic | 181—70 X |
| 2,024,834 | 12/35 | Rippe | 181—63 |
| 2,185,584 | 1/40 | Boyce | 181—49 X |
| 2,557,687 | 6/51 | Rainville | 181—70 |
| 2,613,758 | 10/52 | Cullum | 181—50 |
| 2,685,936 | 8/54 | Brenneman et al. | 181—51 |
| 2,851,123 | 9/58 | Leistritz | 181—70 |
| 2,936,846 | 5/60 | Tyler et al. | 181—60 |

FOREIGN PATENTS

| 20,963 | 1908 | Great Britain. |
| 382,438 | 10/32 | Great Britain. |

OTHER REFERENCES

Noise Control (Publication), vol. 1, No. 4, July 1955, pages 37,041 and 54, article entitled, A Jet Exhaust Silencer, by John Tyler and George Towle.

LEO SMILOW, *Primary Examiner.*

ISAAC LISANN, JOHN C. MACNAB, LAWRENCE V. EFNER, C. W. ROBINSON, *Examiners.*